United States Patent [19]
Ishizumi et al.

[11] 3,910,911
[45] Oct. 7, 1975

[54] PRODUCTION OF QUINAZOLINONE COMPOUNDS

[75] Inventors: Kikuo Ishizumi, Ikeda; Kazuo Mori, Kobe; Michihiro Yamamoto, Nishinomiya; Masao Koshiba; Shigeho Inaba, both of Takarazuka; Hisao Yamamoto, Nishinomiya, all of Japan

[73] Assignee: Sumitomo Chemical Company, Limited, Osaka, Japan

[22] Filed: July 12, 1973

[21] Appl. No.: 378,555

[30] Foreign Application Priority Data
July 20, 1972   Japan.................................. 47-73250

[52] U.S. Cl. .................260/251 QB; 260/326.13 R; 260/544 R; 260/558 S; 260/558 A; 260/559 T; 260/559A; 260/570 AB

[51] Int. Cl.² ........................................... C07D 239/82
[58] Field of Search............................... 260/251 QB

[56] References Cited
UNITED STATES PATENTS
3,712,892   1/1973   Inaba et al.................... 260/251 QB

*Primary Examiner*—Raymond V. Rush
*Attorney, Agent, or Firm*—Stevens, Davis, Miller & Mosher

[57] ABSTRACT

Quinazolinone derivatives, which are useful as anti-inflammatory agents or intermediates for production of other medicines, are prepared by reacting an oxamide derivative with a halogen or hypohalite in the presence of a base.

6 Claims, No Drawings

PRODUCTION OF QUINAZOLINONE COMPOUNDS

This invention relates to a process for preparing quinazolinone derivatives.

More particularly, this invention relates to a process for preparing a quinazolinone derivative of the formula,

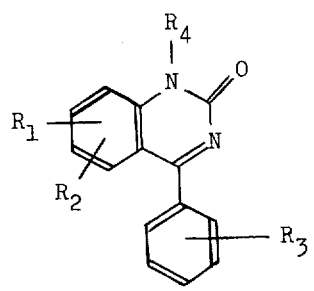

[I]

wherein $R_1$, $R_2$ and $R_3$ are independently a hydrogen atom, a halogen atom, a trifluoromethyl group, a nitro group, a lower alkylsulfonyl group, a lower alkyl group or a lower alkoxy group; and $R_4$ is a hydrogen atom, a lower alkyl group, an aralkyl group, a lower alkanoyloxyalkyl group, a lower alkoxyalkyl group, a polyhaloalkyl group, or a cycloalkylalkyl group.

In the compound of the above formula [I], the term "halogen" includes all halogen atoms, i.e. fluorine, chlorine, bromine and iodine; the term "alkyl" means both straight and branched chain aliphatic hydrocarbon radicals, and lower alkyl is, for example, $C_{1-4}$ alkyl which includes such groups as methyl, ethyl, n-propyl, isopropyl, n-butyl, iso-butyl and tertiary-butyl; the term "lower alkoxy" is, for example, $C_{1-4}$ alkoxy which includes such groups as methoxy, ethoxy, n-propoxy, isopropoxy, n-butoxy and tertiary-butoxy; the term "aralkyl" is, for example, benzyl, phenethyl, phenylpropyl, chlorobenzyl or fluorobenzyl group; the term "lower alkylsulfonyl" is, for example, $C_{1-4}$ alkylsulfonyl which includes such groups as methylsulfonyl, ethylsulfonyl, propylsulfonyl, etc.; the term "lower alkanoyloxyalkyl" is, for example, ($C_{2-3}$ alkanoyloxy) $C_{1-4}$ alkyl in which the $C_{2-3}$ alkanoyloxy moiety includes such groups as acetoxy and propionyloxy, and the $C_{1-4}$ alkyl moiety is the same meanings as mentioned above; the term "lower alkoxyalkyl" is, for example, ($C_{1-4}$ alkoxy)$C_{1-4}$ alkyl in which both moieties are the same meanings as mentioned above; the term "polyhaloalkyl" is, for example, trichloromethyl, trifluoromethyl, trichloroethyl, trifluoroethyl or pentafluoropropyl group; and the term "cycloalkylalkyl" is, for example, ($C_{3-6}$ cycloalkyl) $C_{1-4}$ alkyl in which the $C_{3-6}$ cycloalkyl moiety includes such groups as cyclopropyl, cyclobutyl, cyclopentyl, cyclohexyl, methylcyclopropyl and dimethylcyclopropyl, and the $C_{1-4}$ alkyl moiety is the same meanings as mentioned above.

Further objects and advantages of the present invention will be apparent to one skilled in the art from the accompanying disclosure.

In accordance with the process of the present invention, a quinazolinone derivative of the formula [I] is prepared by reacting an oxamide derivative of the formula,

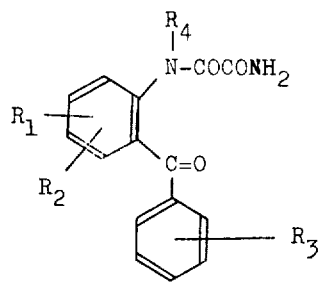

[II]

wherein $R_1$, $R_2$, $R_3$ and $R_4$ are as defined above, with a halogen or hypohalite in the presence of a base.

The oxamide derivative of the formula [II], which represents novel compounds, can easily be prepared by reacting the corresponding 2-aminobenzophenone derivative with an oxalyl halide to yield an oxamyl halide derivative, which is successively treated with ammonia. Alternatively the oxamide derivative of the formula [II] can easily be obtained by oxidizing an indole-2-carboxamide derivative of the formula,

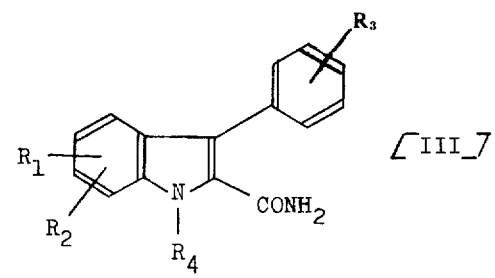

[III]

wherein $R_1$, $R_2$, $R_3$ and $R_4$ are as defined above, with such an oxidizing agent as ozone, chromic acid, a peracid (e.g. performic acid, peracetic acid, perbenzoic acid, etc.) or the like.

In the embodiment of the present invention, the oxamide derivative of the formula [II] is treated with a halogen or hypohalite in the presence of a base preferably in a solvent.

As the hypohalite, sodium hypohalite, potassium hypohalite, or calcium hypohalite is preferable.

As the base, alkali metal hydroxides such as sodium hydroxide, and potassium hydroxide; alkali metal carbonates such as sodium carbonate and potassium carbonate; alkali metal alkoxides such as sodium alkoxide and potassium alkoxide are preferable.

As the solvent, alcohols such as methanol, ethanol, isopropanol, etc., water, chloroform, dioxane, tetrahydrofuran or a mixture thereof are preferable.

The reaction can be easily conducted under cooling, or, if desired, it can be conducted at the reflux temperature of the solvent used.

Since the reaction can be easily conducted irrespective of the presence or absence of water, presumably the reaction does not always involve the formation of an urea intermediate of the formula,

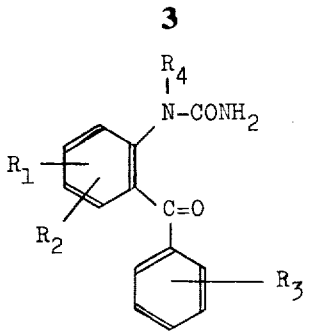

wherein $R_1$, $R_2$, $R_3$ and $R_4$ are the same meanings as defined above, which is considered to be produced in a Hofmann rearrangement.

The quinazolinone derivatives of the formula [I] obtained by the process of the present invention are useful as excellent anti-inflammatory agents with low toxicity and they are also useful as intermediates for preparing other excellent anti-inflammatory agents and central nervous system depressants.

According to the process of the present invention, the following quinazolinone derivatives, for example, can be obtained.

4-Phenyl-2(1H)-quinazolinone.
4-Phenyl-6-chloro-2(1H)-quinazolinone.
4-Phenyl-6-bromo-2(1H)-quinazolinone.
4-Phenyl-6-fluoro-2(1H)-quinazolinone.
4-Phenyl-6-methyl-2(1H)-quinazolinone.
4-Phenyl-6-methoxy-2(1H)-quinazolinone.
4-Phenyl-6-nitro-2(1H)-quinazolinone.
4-Phenyl-6-trifluoromethyl-2(1H)-quinazolinone.
4-Phenyl-6,8-dichloro-2(1H)-quinazolinone.
4-Phenyl-6,7-dimethoxy-2(1H)-quinazolinone.
4-(o-Chlorophenyl)-6-chloro-2(1H)-quinazolinone.
4-(o-Chlorophenyl)-6-nitro-2(1H)-quinazolinone.
4-(o-Fluorophenyl)-6-chloro-2(1H)-quinazolinone.
1-Methyl-4-phenyl-2(1H)-quinazolinone.
1-Methyl-4-phenyl-6-chloro-2(1H)-quinazolinone.
1-Methyl-4-phenyl-6-iodo-2(1H)-quinazolinone.
1-Methyl-4-phenyl-6-methoxy-2(1H)-quinazolinone.
1-Methyl-4-phenyl-6-nitro-2(1H)-quinazolinone.
1-Methyl-4-phenyl-6-trifluoromethyl-2(1H)-quinazolinone.
1,6-Dimethyl-4-phenyl-2(1H)-quinazolinone.
1,8-Dimethyl-4-phenyl-2(1H)-quinazolinone.
1-Ethyl-4-phenyl-6-nitro-2(1H)-quinazolinone.
1-Ethyl-4-(o-tolyl)-6-chloro-2(1H)-quinazolinone.
1-Isopropyl-4-phenyl-6-chloro-2(1H)-quinazolinone.
1-Isopropyl-4-phenyl-6-methoxy-2(1H)-quinazolinone.
1-Isopropyl-4-phenyl-6-nitro-2(1H)-quinazolinone.
1-Isopropyl-4-phenyl-6-trifluoromethyl-2(1H)-quinazolinone.
1-Isobutyl-4-phenyl-6-chloro-2(1H)-quinazolinone.
1-n-Butyl-4-phenyl-6-chloro-2(1H)-quinazolinone.
1-(2,2,2-Trifluoroethyl)-4-phenyl-6-chloro-2(1H)-quinazolinone.
1-Benzyl-4-phenyl-6-nitro-2(1H)-quinazolinone.
1-Acetoxyethyl-4-phenyl-6-chloro-2(1H)-quinazolinone.
1-Acetoxyethyl-4-phenyl-6-nitro-2(1H)-quinazolinone.
1-Methoxymethyl-4-phenyl-6-chloro-2(1H)-quinazolinone.
1-(2-Ethoxyethyl)-4-phenyl-6-nitro-2(1H)-quinazolinone.
1-Cyclopropylmethyl-4-phenyl-6-chloro-2(1H)-quinazolinone.
1-Cyclopropylmethyl-4-(o-tolyl)-6-chloro-2-(1H)-quinazolinone.
1-Cyclopropylmethyl-4-phenyl-6-nitro-2(1H)-quinazolinone.
1-Cyclopropylmethyl-4-phenyl-6-trifluoromethyl-2(1H)-quinazolinone.
1Cyclopropylmethyl-4-phenyl-6-methylsulfonyl-2(1H)-quinazolinone.
1-Cyclopropylmethyl-4-phenyl-6-bromo-(2(1H)-quinazolinone.
1-Cyclopropylmethyl-4-phenyl-6,8-dichloro-2(1H)-quinazolinone.
1-Cyclopropylmethyl-4-phenyl-6-methoxy-2(1H)-quinazolinone
1-Cyclopropylmethyl-4-(o-fluorophenyl)-6-chloro-2(1H)-quinazolinone.
1-Cyclopropylmethyl-4-(m-chlorophenyl)-6-chloro-2(1H)-quinazolinone.
1-Cyclopropylethyl-4-phenyl-6-chloro-2(1H)-quinazolinone.
1-Cyclopropylmethyl-4-(o-chlorophenyl)-6-nitro-2(1H)-quinazolinone.
1-Cyclopentylmethyl-4-phenyl-6-nitro-2(1H)-quinazolinone.
1-Cyclohexylmethyl-4-phenyl-6-nitro-2(1H)-quinazolinone.

The invention is illustrated more perticularly by way of the following examples but, as will be more apparent, is not limited to the details thereof.

EXAMPLE 1

A mixture of 2-methylamino-5-chlorobenzophenone (5.0 g) and 25 g of oxalyl chloride was stirred at room temperature for 2 hours. Excess of oxalyl chloride was removed by distillation under reduced pressure, and the obtained oxamyl chloride was dissolved in 40 ml of ether. Ammonia gas was introduced thereinto under cooling. The deposited crystals were collected by filtration and dissolved in tetrahydrofuran with heating. The solution was filtered from an insoluble material and concentrated under reduced pressure. The obtained residue was crystallized from ether to give N-(2-benzoyl-4-chlorophenyl)-N-methyloxamide having a melting point of 142.5°– 145°C. Recrystallization from a mixture of tertahydrofuran and ether gave crystals having a melting point of 144 – 146.5°C.

The infrared spectrum of the thus obtained sample was identical with that of the compound obtained by oxidation of 1-methyl-3-phenyl-5-chloroindole-2-carboxamide with chromic acid in acetic acid.

EXAMPLE 2

To a solution of 2.4 g of sodium hydroxide in 20 ml of water, 1.92 g of bromine was added dropwise below 0°C and the resulting mixture was cooled to −7°C. To the mixture, a cooled solution of 1.0 g of N-(2-benzoyl-4-chlorophenyl)-N-methyloxamide in 20 ml of tetrahydrofuran was added dropwise with stirring. The thus obtained mixture was stirred at −5°C–3°C for additional 2 hours. The deposit was collected by filtration to obtain 0.23 g of 1-methyl-4-phenyl-6-chloro-2(1H)-quinazolinone having a melting point of 222.5°C–224°C. The tetrahydrofuran layer in the filtrate was separated and the water layer was extracted with ether. The organic layers were combined and dried over Glauber's salt. The solvent was removed by distillation under reduced pressure to give 0.49 g of 1- methyl-4-phenyl-6-chloro-2(1H)-quinazolinone. Washing with ether gave the crystals a melting point of 220°–224°C.

EXAMPLE 3

A solution of 1.0 g of N-(2-benzoyl-4-chlorophenyl)-N-methyloxamide in 10 ml of tetrahydrofuran was added dropwise to 10 ml of a solution of sodium hypochlorite (antiformin) at −5°C–5°C with stirring. After the solution was stirred at 5°C for 4 hours, the tetrahydrofuran layer was separated and the water layer was extracted with ether and chloroform. The organic layers were combined and dried over Glauber's salt. After the solvent was removed by distillation under reduced pressure, the residue was washed with ether to give 1-methyl-4-phenyl-6-chloro-2(1H)-quinazolinone.

EXAMPLE 4

A solution of sodium methoxide was prepared by adding 0.23 g of metallic sodium to 20 ml of methanol and cooled to −7°C. To the solution, 1.0 g of N-(2-benzoyl-4-chlorophenyl)-N-methyloxamide was added and then 0.8 g of bromine was added at −8°C –5°C with stirring. After stirring at −5°C for 3 hours, the deposited crystals were collected by filtration to obtain 0.07 g of 1-methyl-4-phenyl-6-chloro-2(1H)-quinazolinone. The filtrate was concentrated at 40°C under reduced pressure and the residue was treated with water to change red oily deposits gradually to yellow crystals. The crystals were collected by filtration and washed with ether to obtain 0.28 g of 1-methyl-4-phenyl-6-chloro-2(1H)-quinazolinone having a melting point of 220°–223°C. After standing the filtrate for 5 days, additional 0.25 g of product having a melting point of 220.5°–223°C were obtained.

EXAMPLE 5

A solution of sodium methoxide was prepared by adding 0.23 g of metallic sodium to 20 ml of methanol and cooled to −7°C. To the solution, 1.0 g of N-(2-benzoyl-4-chlorophenyl)-N-methyloxamide was added and then 0.8 g of bromine was added at −8°C –5°C with stirring. After stirring at −8°C for 30 minutes and at room temperature for 1 hour, the mixture was heated under reflux for 2 hours. After cooling the reaction solution, yellow crystals were deposited. The crystals were collected by filtration and dried to give 0.45 g of 1-methyl-4-phenyl-6-chloro-2(1H)-quinazolinone having a melting point of 221.5°–222.5°C. The filtrate was concentrated under reduced pressure to one third by volume and water was added thereto to obtain additional 0.12 g of crystals having a melting point of 219°–222°C.

EXAMPLE 6

A mixture of 5.0 g of 2-cyclopropylmethylamino-5-chlorobenzophenone and 10 g of oxalyl chloride was stirred at room temperature for 2 hours. Excess of oxalyl chloride was evaporated under reduced pressure and the obtained oxamyl chloride was dissolved in 30 ml of tetrahydrofuran. Ammonia gas was passed through the solution under cooling. The resulting precipitates deposited were collected by filtration and washed thoroughly with tetrahydrofuran. The filtrate and washings were combined, and evaporated under reduced pressure. The residual oil was crystallized from ether to give N-(2-benzoyl-4-chlorophenyl)-N-cyclopropylmethyloxamide, m.p. 144.5°–145.5°C. Recrystallization from tetrahydrofuran afforded crystals having a melting point of 143.5°–144.5°C.

EXAMPLE 7

To a solution of 2.3 g of sodium hydroxide in 20 ml of water, 1.8 g of bromine was added dropwise below 0°C and the resulting mixture was cooled to −7°C. To the mixture, a cooled solution of 1.0 g of N-(2-benzoyl-4-chlorophenyl)-N-cyclopropylmethyloxamide in 20 ml of tetrahydrofuran was added dropwise with stirring. The thus obtained mixture was stirred at −5°C –3°C for additional 45 minutes. The tetrahydrofuran layer in the reaction mixture was separated and the water layer was extracted with ether. The organic layers were combined and dried over Glauber's salt. The solvent was removed by distillation under reduced pressure to give 0.8 g of 1-cyclopropylmethyl-4-phenyl-6-chloro-2(1H)-quinazolinone, m.p. 173°–174°C. Recrystallization from ethanol gave the crystals having a melting point of 175°–176°C.

EXAMPLE 8

A mixture of 3.0 g of 2-amino-5-chlorobenzophenone, 5 g of oxalyl chloride and 5 ml of toluene was stirred at room temperature for 15 minutes. Excess of oxalyl chloride and toluene were evaporated under reduced pressure and the obtained oxamyl chloride was dissolved in 20 ml of tetrahydrofuran. Ammonia gas was passed through the solution under cooling. The resulting precipitates deposited were collected by filtration and washed thoroughly with tetrahydrofuran. The filtrate and washings were combined and evaporated under reduced pressure to give N-(2-benzoyl-4-chlorophenyl)oxamide, m.p. 198°–200°C. Recrystallization from tetrahydrofuran afforded crystals having a melting point of 208°–209°C.

EXAMPLE 9

A solution of sodium methoxide was prepared by adding 0.3 g of metallic sodium to 20 ml of methanol and cooled to −7°C. To the solution, 1.0 g of N-(2-benzoyl-4-chlorophenyl)oxamide was added and then 0.8 g of bromine was added at −8°C –5°C with stirring. After stirring at −8°C for 30 minutes and at room temperature for 1 hour, the mixture was heated under reflux for 2 hours. After cooling the reaction solution was filtered to remove an insoluble material, and the filtrate was partly evaporated and diluted with water. The resulting gummy material was gradually crystallized. The crystals were collected by filtration and heated in toluene. After cooling, the precipitates deposited were collected by filtration to give 4-phenyl-6-chloro-2(1H)-quinazolinone, m.p. > 300°C.

EXAMPLE 10

To a suspension of 10 g of 1-methyl-3-phenyl-5-nitroindole-2-carboxamide in 68 ml of glacial acetic acid, a solution of 10.2 g of chromic anhydride in 10 ml of water was added dropwise below 20°C with stirring. Then the reaction was carried out at room temperature for 2 hours. The reaction mixture was poured into 500 ml of water and deposited crystals were collected by filtration. The crystals were dissolved in 500 ml of methylene chloride and the resulting solution was washed with water and dried over anhydrous sodium sulfate. The solvent was removed by distillation under reduced pressure. The resulting oily residue was crystallized from methylene chloride and ether to give 6.44 g of N-(2-benzoyl-4-nitrophenyl)-N-methyloxamide having a melting point of 152°–157°C. From the filtrate, 0.233 g of crystals were further obtained.

EXAMPLE 11

A solution of sodium methoxide was prepared by dissolving 0.21 g of metallic sodium in 20 ml of methanol. The solution was cooled to −7°C and 1.0 g of N-(2-benzoyl-4-nitrophenyl)-N-methyloxamide and then 0.98 g of bromine were added thereto with stirring. The mixture was continued stirring at −5°–10°C for 1.5 hours while depositing yellow crystals. After refluxing for 2 hours, the reaction mixture was cooled with ice. The deposited crystals were collected by filtration, washed with water, washed with ether and dried under reduced pressure to give 0.67 g of 1-methyl-4-phenyl-7-nitro-2(1H)-quinazolinone. Recrystallization from tetrahydrofuran gave crystals having a melting point of 267°–267.5°C.

What is claimed is:

1. A process for preparing a quinazolinone of the formula,

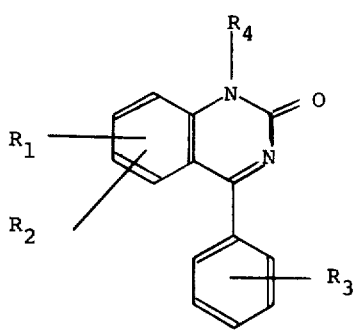

wherein $R_1$, $R_2$ and $R_3$ are independently hydrogen atom, halogen atom, trifluoromethyl, nitro, lower aklylsulfonyl, lower alkyl or lower alkoxy; and $R_4$ is hydrogen atom, lower alkyl, benzyl, chlorobenzyl, fluorobenzyl, phenethyl, phenylpropyl, ($C_1$-$C_4$alkoxy)$C_1$-$C_4$ alkyl, polyhalo $C_1$-$C_3$alkyl, or ($C_3$-$C_6$ cycloalkyl)$C_1$-$C_4$ alkyl, which comprises the step of reacting an oxamide of the formula,

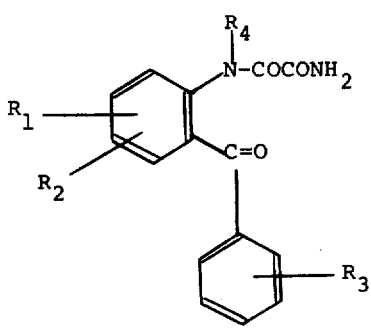

wherein $R_1$, $R_2$, $R_3$ and $R_4$ are as defined above, with a halogen, sodium hypohalite, potassium hypohalite or calcium hypohalite in the presence of a base selected from the group consisting of alkali metal hydroxides, alkali metal carbonates and alkali metal alkoxides under cooling or at a temperature up to the reflux temperature of the solvent used.

2. A process according to claim 1, wherein the oxamide of the formula,

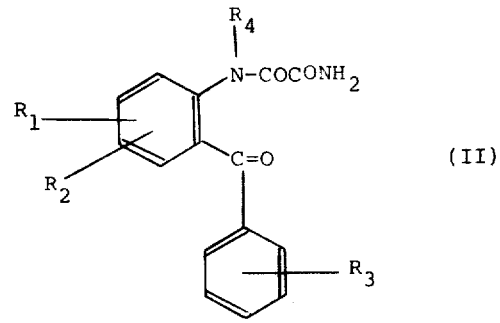

wherein $R_1$, $R_2$, $R_3$ and $R_4$ are as defined above, is prepared by reacting a 2-aminobenzophenone of the formula,

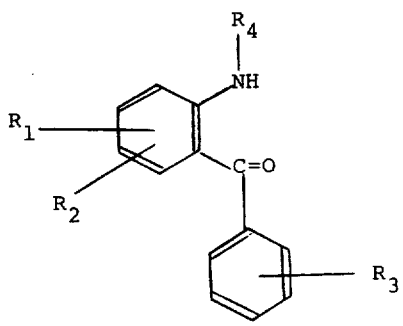

wherein $R_1$, $R_2$, $R_3$ and $R_4$ are as defined above, with oxalyl chloride to yield the corresponding oxamyl chloride, which is successively treated with ammonia.

3. A process according to claim 1, wherein the oxamide of the formula (II) is prepared by oxidizing an indole-2-carboxamide of the formula

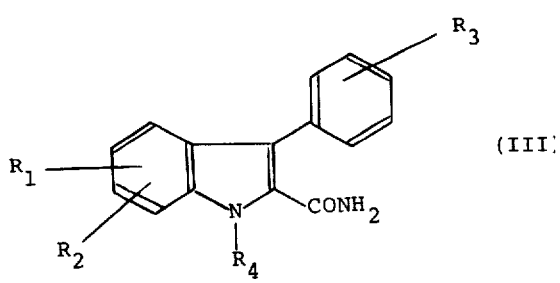

wherein $R_1$, $R_2$, $R_3$ and $R_4$ are as defined in claim 1, with chromic acid in the presence of a solvent.

4. A process according to claim 1, wherein the base is sodium hydroxide, potassium hydroxide, sodium carbonate, potassium carbonate, sodium alkoxide or potassium alkoxide.

5. A process according to claim 1, wherein the reaction is carried out in the presence of a solvent.

6. A process according to claim 5 wherein the solvent is methanol, ethanol, isopropanol, water, chloroform, dioxane, tetrahydrofuran or a mixture thereof.

* * * * *